United States Patent

Takashima

[11] Patent Number: 5,855,644
[45] Date of Patent: Jan. 5, 1999

[54] METHOD FOR RECOVERING ALUMINIUM FROM MATERIALS CONTAINING METALLIC ALUMINIUM

[75] Inventor: Masaru Takashima, Tokyo, Japan

[73] Assignee: Aikoh Co., Ltd., Tokyo, Japan

[21] Appl. No.: 817,555

[22] PCT Filed: Feb. 1, 1995

[86] PCT No.: PCT/JP95/00131

§ 371 Date: Apr. 4, 1997

§ 102(e) Date: Apr. 4, 1997

[87] PCT Pub. No.: WO96/18746

PCT Pub. Date: Jan. 20, 1996

[30] Foreign Application Priority Data

Dec. 12, 1994 [JP] Japan .................................. 6-307432

[51] Int. Cl.$^6$ ...................................................... C22B 21/00
[52] U.S. Cl. ................................ 75/403; 75/433; 75/671
[58] Field of Search .............................. 75/403, 433, 671

[56] References Cited

U.S. PATENT DOCUMENTS 5,405,428   4/1995   Dube et al. ................................ 75/403

FOREIGN PATENT DOCUMENTS 19180    5/1977   Japan .
112673   9/1977   Japan .
37337    8/1984   Japan .
230942  11/1985   Japan .

*Primary Examiner*—Melvyn Andrews
*Attorney, Agent, or Firm*—Abelman, Frayne & Schwab

[57] ABSTRACT

According to the present method it is possible to recover metallic aluminium easily and at high recovery rate and low cost from metallic aluminium containing wastes disposed recently in great amounts, said wastes being, for example, aluminium can, aluminium laminated foil, aluminium scraps, aluminium chips, and any other aluminium containing (or accompanying) material. The invention is technically constituted such that the combustible substances of metallic aluminium containing materials are carbonized in a kiln in an atmosphere where oxygen concentration is not higher than 10% by volume or an atmosphere of a carbon dioxide gas, and which kiln is in the temperature range of 300°–600° C., and after cooling, carbonized material and iron content are separated by sieving or magnetically.

4 Claims, No Drawings

METHOD FOR RECOVERING ALUMINIUM FROM MATERIALS CONTAINING METALLIC ALUMINIUM

FIELD OF THE INVENTION

This invention relates to a method for recovering aluminium from materials containing metallic aluminium, in which method it is intented to improve the recovery rate of aluminium and to promote recycling of resources. Hereupon by the materials containing (or accompanying) aluminium are meant such ones as aluminium can, aluminium laminated foil, aluminium scraps, aluminium chips, and other aluminium containing materials.

BACKGROUND OF THE INVENTION

Conventionally various methods have been proposed to recover aluminium from materials containing metallic aluminium, but they have demerits in that the recovery rate of aluminium is low, it is difficult to separate the accompanying impurities (or unnecessary materials) such as paint, organic materials (paper, resin and the like) and iron, and therefore the metallic aluminium content in the reclaimed aluminium is low.

The known techniques for recovering aluminium are, for example, as follows.

(1) Method for manufacturing flake powder or twist unshaped small granular articles of metallic aluminium (see Patent Publication No. 52-19180).

(2) Method for recovering plastics and aluminium from the wrapper waste of medical tablets (see Patent Kokai No. 52-112673).

(3) Method for removing organic coatings from scrap aluminium (see Patent Publication No. 59-37337).

(4) Method for recovering aluminium from waste aluminium cans and subjecting it to a pre-treatment for reclaiming and melting it (see Patent Publication No. 2-53494).

(5) The method of recovering Al-foil from band shape Al-laminate scrap, comprises 1) heating the Al-laminate in non-oxidised atoms. at 400–600 deg. C. to carbonize paper and plastics; 2) subjecting the carbonized substances to crushing to pulverise the carbonized materials, followed by separation of Al-foil from the carbonized materials (see Patent Kokai No. 60-230942).

Each of the above-mentioned known techniques involves a great number of complicated steps, and the recent wastes which contain or accompany metallic aluminium have various components, so that such techniques are very costly in equipment to recover metallic aluminium in a simple way, and evidently they have difficulty in their workability.

DISCLOSURE OF THE INVENTION

The object of the invention is to provide a method for recovering metallic aluminium easily and at high recovery rate and low cost from metallic aluminium containing wastes disposed recently in great amounts, said wastes being, for example, aluminium can, aluminium laminated foil, aluminium scraps, aluminium chips, and other aluminium containing (or accompanying) materials. The present invention is technically constituted such that the combustible substances of metallic aluminium containing materials are carbonized in a kiln in an atomosphere where oxygen concentration is not higher than 10% by volume or an atomosphere of a carbon dioxide gas, and which kiln is in the temperature range of 300°–600° C., and that after cooling, carbonized material and iron content are separated by sieving or magnetically.

BEST MODE OF CARRYING OUT THE INVENTION

The method of recovering aluminium materials, which is technically constituted as above in the present invention, will be described below in detail.

(1) The first step of crushing and/or shearing the materials containing metallic aluminium The materials containing metallic aluminium are crushed into pieces of not greater than 40 mm by a crusher of shearing type (like a single axle crusher) or impact type (like hammer crusher).

(2) The second step of separating metallic aluminium from the crushed articles

The metallic aluminium containing materials now crushed are fed into a kiln where the oxygen concentration is controlled below 10% by volume, the combustible substances such as of resin or paper are carbonized in the temperature range of 300°–600° C. without oxidizing metallic aluminium, and after discharging and cooling, iron carbonized material and content are removed by sieving or magnetic separation.

The reason of making the oxygen concentration in the second step 10% by volume is that in excess of 10% by volume the recovery rate is significantly lowered because of oxidation of aluminium.

On the other hand, by making the interior of the kiln in the second step a $CO_2$ gas atmosphere it is possible to the metallic aluminium in the materials to be protected from oxidation.

In that case, referring to nitrogen usable for the same purpose, it generates harmful non-metallic inclusions as AlN so that $CO_2$ is preferable.

Then, the reason of making the kiln temperature a range of 300°–600° C. is that if it exceeds 600° C. oxidation is promoted even if the oxygen concentration is not greater than 10% by volume, while if it lower than 300° C. the carbonizing speed of the combustible substances is low thereby causing a bad workability, so both of them are not prefer.

Said the first step (crushing step) is sometimes omitted.

It is thus capable of manufacturing reclaimed aluminium materials by the above steps.

The invention will now be described in the following Examples.

EXAMPLE 1

A recovered material containing metallic aluminium was crushed by a single axle shearing machine, the crushed pieces were passed through a 25 mm screen so as to be discharged, they are then charged into a kiln whose temperature is about 450° C. and oxygen concentration is 6–7% by volume and in which kiln the organic substances such as paper, resin and rubber are carbonized or burned, the exhaust gas was subject to a secondary combustion for through combustion in a re-heating furnace to allow it to be a harmless gas, and part of the gas was re-used for heat recovery.

The metallic aluminium containing material after the heat treatment was sieved to fine powder through a 3 mm sieve opening vibration screen to remove foreign particles.

The metallic aluminium separated by the above steps was cooled at a temperaure below 200° C., it re-crushed to pieces of not greater than 6 mm by a hammer crusher, and the pieces of not greater than 1 mm were separated and removed by cyclone.

The aluminium content of the aluminium material thus reclaimed was about 96% by weight.

EXAMPLE 2

A roll of recovered aluminium laminated foil was charged into a batch type kiln, and a carbon dioxide gas was injected into the kiln to heat said roll to 550° C. in a $CO_2$ atomosphere. The laminate material of the aluminium foil started to decompose approximately in the neighbourhood of 230° C., the decomposition gas was thoroughly burned in a combustion apparatus so as to be a harmless gas, and the combustion heat was re-used as a heating resource. When the decomposition gas generation stopped after heating to 550° C., the heating was stopped, it was then cooled to a room temperature, and thereafter it was discharged. As a residue there was obtained a black substance of residual carbon between aluminium foils in the roll form, and therefore it was crushed and separated to recover aluminium.

To add, though in the above Examples the material was treated without crushing, a crushing may be effected before the treatment. However, it will be unavoidable that the material to be treated becomes bulky through crushing. On the other hand, in the case of previously crushing the material to be treated, it does not require, needless to state, the crushing step when the residual carbon is separated.

According to the present invention, it is possible to recover metallic aluminium easily and at high recovery rate and low cost from the wastes containing metallic aluminium.

Further, the aluminium thus recovered can be properly re-used as a substitute of or for material increase of ingot metal as reclaimed aluminium materials, or even as the aluminium source of deoxidizing agent for steel making.

INDUSTRIAL FIELD OF THE INVENTION

According to the present invention, aluminium is recovered as reclaimed aluminium from materials containing metallic aluminium, aluminium recovery rate is improved, and recycling of resources is promoted.

What is claimed is:

1. A method for recovering aluminium from carbonized combustible substances containing metallic aluminium and having contained iron comprising carbonizing the combustible substances in an atmosphere in which the oxygen concentration is not greater than 10% by volume and in the temperature range of 300°–600° C., and separating the carbonized combustible substances and the contained iron accompanied by metallic aluminium after cooling, by sieving or magnetic separation.

2. A method for recovering aluminium from carbonized combustible substances containing metallic aluminium and having contained iron comprising carbonizing the combustible substances in a kiln having an atmosphere of carbon dioxide gas and a temperature range of 300°–600° C., and separating the carbonized combustible substances and the contained iron accompanied by metallic aluminium by sieving or magnetic separation after cooling.

3. A method in accordance with claim 1 wherein said materials containing metallic aluminium are aluminium can, aluminium laminated foil, aluminium scraps, aluminium chips and any other aluminium containing material.

4. A method in accordance with claim 2 wherein said materials containing metallic aluminium are aluminium can, aluminium laminated foil, aluminium scraps, aluminium chips, and any other aluminium containing material.

* * * * *